United States Patent
Hsieh

(10) Patent No.: US 10,654,258 B2
(45) Date of Patent: May 19, 2020

(54) THREE DIMENSIONAL PRINTING APPARATUS AND CONTROLLING METHOD THEREOF

(71) Applicants: XYZprinting, Inc., New Taipei (TW); Kinpo Electronics, Inc., New Taipei (TW)

(72) Inventor: Hsin-Ta Hsieh, New Taipei (TW)

(73) Assignees: XYZprinting, Inc., New Taipei (TW); Kinpo Electronics, Inc., New Taipei (TW)

(*) Notice: Subject to any disclaimer, the term of this patent is extended or adjusted under 35 U.S.C. 154(b) by 227 days.

(21) Appl. No.: 15/428,155

(22) Filed: Feb. 9, 2017

(65) Prior Publication Data
US 2018/0186093 A1    Jul. 5, 2018

(30) Foreign Application Priority Data

Jan. 3, 2017 (TW) .............................. 106100077 A

(51) Int. Cl.
*B33Y 10/00* (2015.01)
*B33Y 30/00* (2015.01)
(Continued)

(52) U.S. Cl.
CPC ............ *B33Y 10/00* (2014.12); *B29C 64/106* (2017.08); *B29C 64/118* (2017.08); *B29C 64/20* (2017.08);
(Continued)

(58) Field of Classification Search
CPC ..... B29C 64/386; B29C 64/20; B29C 64/118; B29C 64/336; B29C 64/106;
(Continued)

(56) References Cited

U.S. PATENT DOCUMENTS

| 2014/0070461 A1* | 3/2014 | Pax ....................... B33Y 50/02 |
| | | 264/401 |
| 2014/0277661 A1* | 9/2014 | Amadio ............. G05B 19/4099 |
| | | 700/97 |

(Continued)

FOREIGN PATENT DOCUMENTS

| CN | 104690973 | 6/2015 |
| CN | 105252771 | 1/2016 |

(Continued)

OTHER PUBLICATIONS

"Office Action of China Counterpart Application," , dated Aug. 26, 2019, p. 1-p. 7.

(Continued)

*Primary Examiner* — Michael M. Robinson
(74) *Attorney, Agent, or Firm* — JCIPRNET

(57) ABSTRACT

A three dimensional printing apparatus and a controlling method thereof are provided. A first forming material and a second forming material are adapted for being fed into a melting nozzle. A controller determines a first pulling-back amount according to a first feeding-in ratio of the first forming material and determines a second pulling-back amount according to a second feeding-in ratio of the second forming material. During a period in which a printing module stops extruding any material, the controller controls a feeding module to pull back the first forming material along a direction which is departing from a melting nozzle and controls the feeding module to pull back the second forming material along the direction which is departing from the melting nozzle.

5 Claims, 4 Drawing Sheets

(51) Int. Cl.
- *B33Y 50/02* (2015.01)
- *B29C 64/336* (2017.01)
- *B29C 64/386* (2017.01)
- *B29C 64/393* (2017.01)
- *B29C 64/118* (2017.01)
- *B29C 64/106* (2017.01)
- *B29C 64/20* (2017.01)

(52) U.S. Cl.
CPC .......... *B29C 64/336* (2017.08); *B29C 64/386* (2017.08); *B29C 64/393* (2017.08); *B33Y 30/00* (2014.12); *B33Y 50/02* (2014.12); *B29K 2995/0021* (2013.01)

(58) Field of Classification Search
CPC ....... B29C 64/393; B33Y 10/00; B33Y 50/02; B33Y 30/00; B29K 2995/0021
See application file for complete search history.

(56) References Cited

U.S. PATENT DOCUMENTS

| | | | |
|---|---|---|---|
| 2016/0250793 A1* | 9/2016 | DiVencenzo | B33Y 10/00 264/211.22 |
| 2017/0368755 A1* | 12/2017 | Bader | B33Y 10/00 |

FOREIGN PATENT DOCUMENTS

| | | |
|---|---|---|
| JP | 2016013621 | 1/2016 |
| JP | 2016088049 | 5/2016 |
| KR | 101346704 | 12/2013 |
| WO | 2015073301 | 5/2015 |

OTHER PUBLICATIONS

"Office Action of Japan Counterpart Application," dated Nov. 12, 2019, p. 1-p. 4.

* cited by examiner

THREE DIMENSIONAL PRINTING APPARATUS AND CONTROLLING METHOD THEREOF

CROSS-REFERENCE TO RELATED APPLICATION

This application claims the priority benefit of Taiwan application serial no. 106100077, filed on Jan. 3, 2017. The entirety of the above-mentioned patent application is hereby incorporated by reference herein and made a part of this specification.

BACKGROUND

1. Technical Field

The present disclosure relates to a printing apparatus, and in particular, to a three dimensional printing apparatus and a controlling method thereof.

2. Description of Related Art

With the progress of computer-aided manufacturing (Computer-Aided Manufacturing, CAM), the manufacturing industry has developed three dimensional printing technologies, which can rapidly manufacture original concepts of designs. The three dimensional printing technologies are actually a collective name of a series of rapid prototyping (Rapid Prototyping, RP) technologies, and basic principles thereof are all laminated manufacturing, that is, a rapid prototyping machine forms a cross-sectional shape of a workpiece in a form of scanning within an X-Y plane, and performs displacement of a layer thickness discontinuously on Z coordinates, to finally form a three dimensional object. The three dimensional printing technologies do not limit geometrical shapes, and complicated parts indicate excellence of the RP technologies, that is, manpower and processing time are saved greatly; and under a requirement of saving most time, a digital three dimensional model designed by 3D computer-aided design (Computer-Aided Design, CAD) software is truly presented.

Currently, most of three dimensional printing apparatuses that form three dimensional objects by using the foregoing rapid prototyping methods convey hot melt forming materials to a nozzle by using a feeding mechanism, and heat and melt the forming materials by means of a fed material heating structure and the nozzle, and coat same on a platform layer by layer to form a three dimensional object. In consideration of three dimensional printing quality, to prevent redundant forming materials from dripping from a nozzle in an extrusion stopping period, a three dimensional printing apparatus slightly pulls the forming materials away from the nozzle in a filament-extruding suspending period. On the other aspect, to increase practicability of the three dimensional printing apparatus and diversity of three dimensional printed objects, a function capable of printing a three dimensional object with multiple colors is also one of focuses of research and development people. By mixing, in the nozzle, forming materials in molten state with two different colors, the nozzle of the three dimensional printing apparatus may coat a forming material with a harmonious color on a platform. However, if same amounts of two forming materials are pulled away from a same nozzle in the filament-extruding suspending period, when the three dimensional printing apparatus performs printing again and continues to feed the two forming materials into the nozzle again, a harmonious color of a forming material extruded by the nozzle is different from expected. Consequently, there is a gap between the printed three dimensional object and actual expectation, and therefore printing quality and printing yield of the three dimensional printing apparatus are reduced.

SUMMARY

In view of the above, the present disclosure provides a three dimensional printing apparatus and a control method thereof, so as to respectively determine, according to feeding-in ratios of different forming materials, pulling-back amounts by which forming materials are pulled back from a nozzle, thereby maintaining consistency between harmonious colors of forming materials extruded by the nozzle.

The present disclosure provides a three dimensional printing apparatus, which includes a platform that has a bearing surface, a printing module, and a controller. The printing module is disposed above the platform, and includes a melting nozzle and a feeding module. The melting nozzle is configured to melt a first forming material having a first color and a second forming material having a second color; and the feeding module is configured to feed the first forming material and the second forming material to the melting muzzle in a filament-extruding period. The controller is coupled to the printing module. The controller determines a first pulling-back amount according to a first feeding-in ratio of the first forming material and determines a second pulling-back amount according to a second feeding-in ratio of the second forming material in a filament-extruding suspending period of the printing module. The controller controls the feeding module to pull pack the first forming material according to the first pulling-back amount along a direction which is departing from the melting nozzle in the filament-extruding suspending period, and controls the feeding module to pull pack the second forming material according to the second pulling-back amount along the direction which is departing from the melting nozzle in the filament-extruding suspending period.

From another point of view, the present disclosure provides a method for controlling a three dimensional printing apparatus. The three dimensional printing apparatus includes a melting nozzle and a feeding module. The method includes the following steps: when operating in a filament-extruding period, the feeding module is controlled to feed a first forming material and a second forming material to the melting nozzle, so as to drive the melting nozzle to extrude a third forming material generated by mixing the first forming material and the second forming material; a first pulling-back amount is determined according to a first feeding-in ratio of the first forming material, and a second pulling-back amount is determined according to a second feeding-in ratio of the second forming material; and when operating in a filament-extruding suspending period, the feeding module is controlled to pull pack the first forming material according to the first pulling-back amount along a direction which is departing from the melting nozzle, and the feeding module is controlled to pull pack the second forming material according to the second pulling-back amount along the direction which is departing from the melting nozzle, and the melting nozzle is driven to leave a printing end location.

Based on the above, in embodiments of the present disclosure, a first pulling-back amount of a first forming material is determined according to a first feeding-in ratio of the first forming material, and a second pulling-back amount of a second forming material is determined according to a second feeding-in ratio of the second forming material. When the three dimensional printing apparatus operates in a filament-extruding suspending period, the feeding module pulls back the first forming material according to the first pulling-back amount along a direction which is departing from the melting nozzle and pulls back the second forming material according to the second pulling-back amount along the direction which is departing from the melting nozzle. In this way, by means of adaptively adjusting individual pulling-back amounts of different forming materials, when the three dimensional printing apparatus operates in a filament-extruding period again, a color of a third forming material generated in the melting nozzle by mixing the first forming material and the second forming material can maintain consistency, so as to prevent the three dimensional printing apparatus from printing a three dimensional printed object with a non-uniform color.

In order to make the aforementioned and other objectives and advantages of the present disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
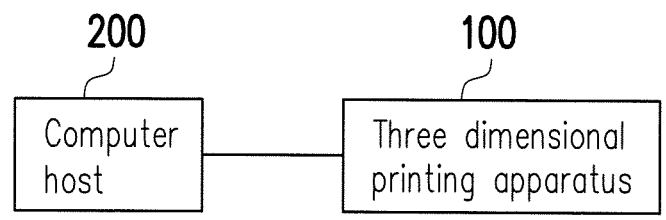
FIG. 1 is a schematic block diagram of a working situation of a three dimensional printing apparatus according to an embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic block diagram of a working situation of a three dimensional printing apparatus according to an embodiment of the present disclosure. Referring to FIG. 1, a three dimensional printing apparatus 100 of the present embodiment is adapted for printing a three dimensional object according to three dimensional model information. Further, a computer host 200 is an apparatus that has an computing function, for example, a computer apparatus, such as a notebook computer, a tablet computer, or a desktop computer. The present disclosure does not limit types of the computer host 200. The computer host 200 can edit and process a three dimensional model of a three dimensional object and transmit related three dimensional model information to the three dimensional printing apparatus 100, so that the three dimensional printing apparatus 100 can print a three dimensional object according to the three dimensional model information. In the present embodiment, the three dimensional model may be a three dimensional digital image file, which may be constructed by a computer host 200 by means of computer-aided design (computer-aided design, CAD), animation modeling software, or the like, and the computer host 200 performs a layer slicing processing on the three dimensional model to obtain three dimensional model information associated with multiple layer objects, so that the three dimensional printing apparatus 100 can sequentially print each layer object according to the three dimensional model information that corresponds to the layer objects, so as to finally form a complete three dimensional object.

Figure 2:
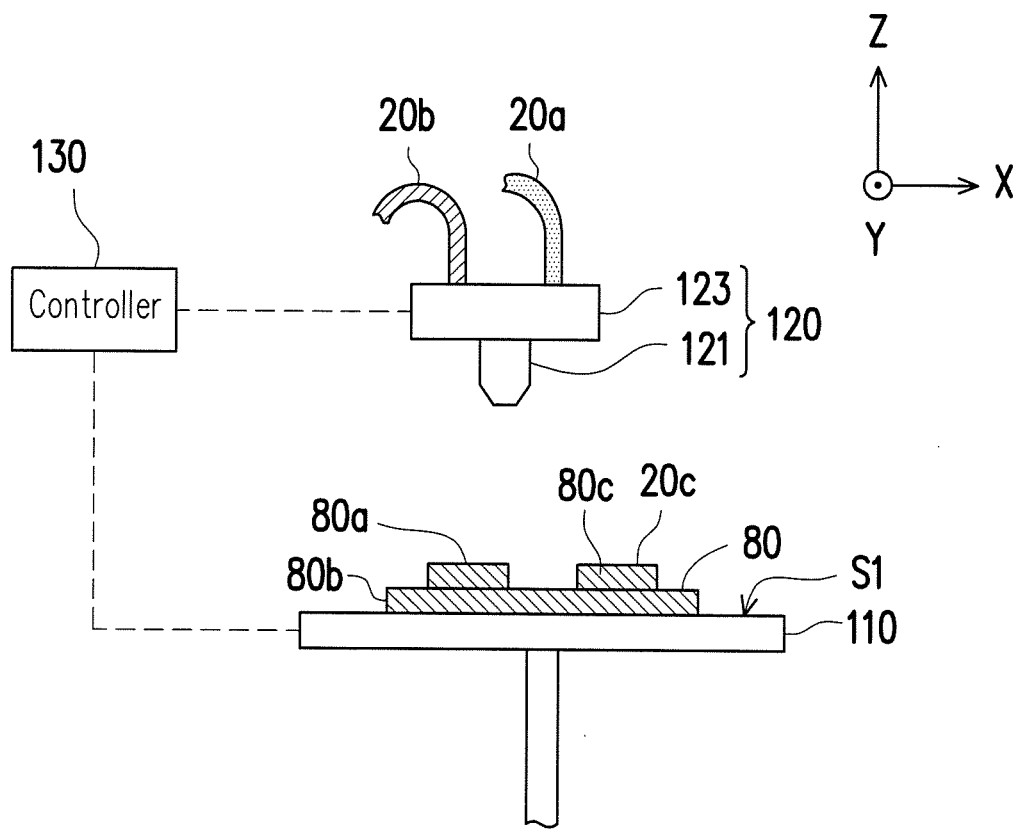
FIG. 2 is a schematic diagram of a three dimensional printing apparatus according to an embodiment of the present disclosure.

FIG. 2 is a schematic diagram of a three dimensional printing apparatus according to an embodiment of the present disclosure. Referring to FIG. 2, the three dimensional printing apparatus 100 includes a platform 110, a printing module 120, and a controller 130. A rectangular coordinate system is also provided herein to facilitate describing related means and motion states thereof. The platform 110 includes a bearing surface S1, configured to bear a three dimensional object 80 in printing. The printing module 120 is disposed above the platform 110 and includes a melting nozzle 121 and a feeding module 123. In the present embodiment, the feeding module 123 is configured to feed a first forming material 20a and a second forming material 20b to the melting nozzle 121 in a filament-extruding period, and the melting nozzle 121 is configured to melt the first forming material 20a that has a first color and a second forming material 20b that has a second color. The printing module 120 is configured to move along an XY plane and along a normal direction of the XY plane (a direction of a Z axis), so that the melting nozzle 121 coats a third forming material 20c on the bearing surface S1 of the platform 110. Specifically, the melting nozzle 121 extrudes the third forming material 20c generated by mixing the first forming material 20a and the second forming material 20b, so that the third foil ling material 20c is cured into the three dimensional object 80 on the platform 110.

Further, the controller 130 is coupled to the platform 110 and the printing module 120, and can be configured to read three dimensional model information provided by the computer host 200, and control overall operation of the three dimensional printing apparatus 100 according to the three dimensional model information to print the three dimensional object 80. For example, the controller 130 may control a motion path of the printing module 120 according to three dimensional digital model information. The controller 130, for example, is a device that has an computing function, for example, a central processing unit, a chipset, a microprocessor, or an embedded controller.

Further, the controller 130 may control, according to the three dimensional model information, the printing module 120 to move above the platform 110, and control the feeding module 123 to feed the first forming material 20a and the second forming material 20b to the melting nozzle 121 in a filament-extruding period. The first forming material 20a and the second forming material 20b may be hot melt filaments suitable for fused filament fabrication, and are heated by using the melting nozzle 121, so that the first forming material 20a and the second forming material 20b that are conveyed to the melting nozzle 121 are molten into a fluid material in molten state. In the present embodiment, the first forming material 20a has a first color, and the second forming material 20b has a second color. The first forming material 20a and the second forming material 20b that are in molten state are mixed in a chamber of the melting nozzle 121, to generate the third foaming material 20c that has a third color. The melting nozzle 121 extrudes the third forming material 20c that has the third color and that is in molten state, so that the third forming material 20c extruded by the melting nozzle 121 is cured into the three dimensional object 80 on the platform 110.

In this case, the third color is determined according to a ratio of a feeding-in amount of the first forming material 20a to a feeding-in amount of the second forming material 20b that are fed into the melting nozzle 121. By using that the wire-shaped first forming material/second forming material that can be measured in length units is fed as an example, the feeding-in amount of the first forming material 20a, for example, is 1.2 cm/min, and the feeding-in amount of the second forming material 20b, for example, is 0.8 cm/min. That is, the feeding module 123 feeds the first forming material 20a into the melting nozzle 121 at a speed of 1.2 cm/min, and feeds the second forming material 20b into the melting nozzle 121 at a speed of 0.8 cm/min.

A sum of a first feeding-in ratio and a second feeding-in ratio satisfies a preset percent. By using that the sum of the first feeding-in ratio and the second feeding-in ratio satisfies a hundred percent as an example, an overall feeding-in amount of the third forming material 20c extruded by the melting nozzle 121 is substantively equal to a sum of the feeding-in amount of the first forming material 20a and the feeding-in amount of the second forming material 20b. Herein, a ratio of the feeding-in amount of the first forming material 20a to an overall feeding-in amount of the melting nozzle 121 is referred as the first feeding-in ratio, and a ratio of the feeding-in amount of the second forming material 20b to the overall feeding-in amount of the melting nozzle 121 is referred as the second feeding-in ratio. For example, if the feeding-in amount of the first forming material 20a is 1.2 cm/min, and the feeding-in amount of the second totaling material 20b is 0.8 cm/min, the first feeding-in ratio of the first forming material 20a is 60%, and the second feeding-in ratio of the second forming material 20b is 40%. Therefore, because the third color is determined according to the ratio of the feeding-in amount of the first forming material 20a to the feeding-in amount of the second forming material 20b, the third color of the third foil ling material 20c may also be considered to be determined according to the first feeding-in ratio of the first forming material 20a and the second feeding-in ratio of the second forming material 20b.

Figure 3A:
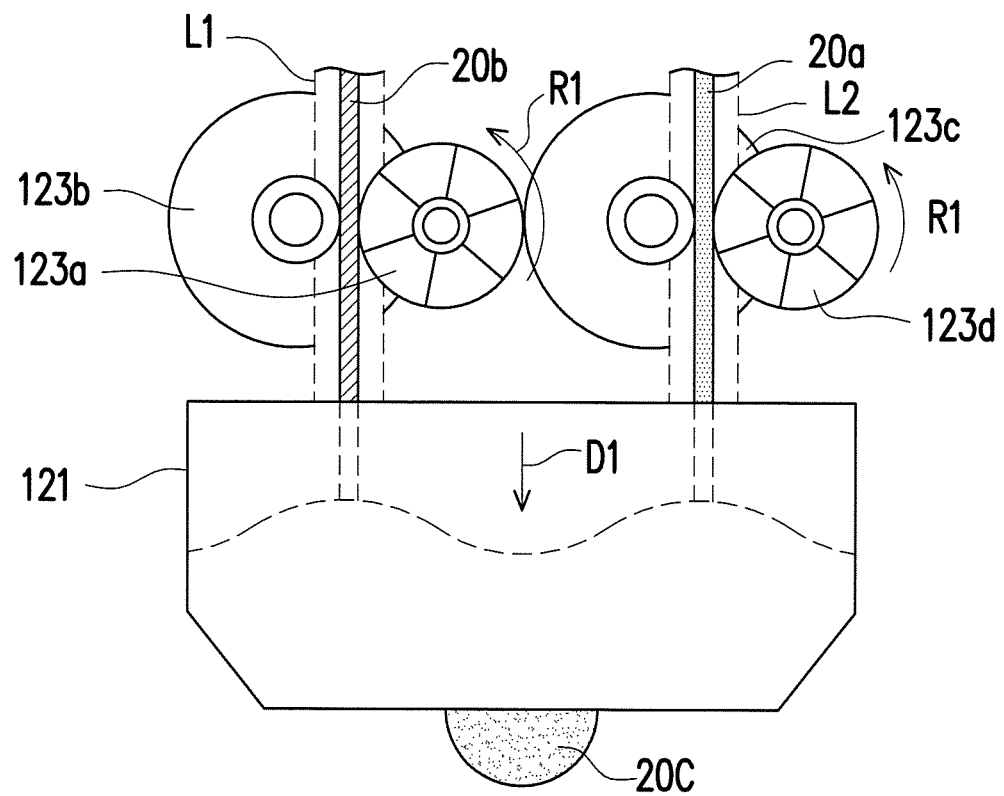
FIG. 3A and FIG. 3B are schematic diagrams of a melting nozzle and a feeding module according to an embodiment of the present disclosure.
Figure 3B:
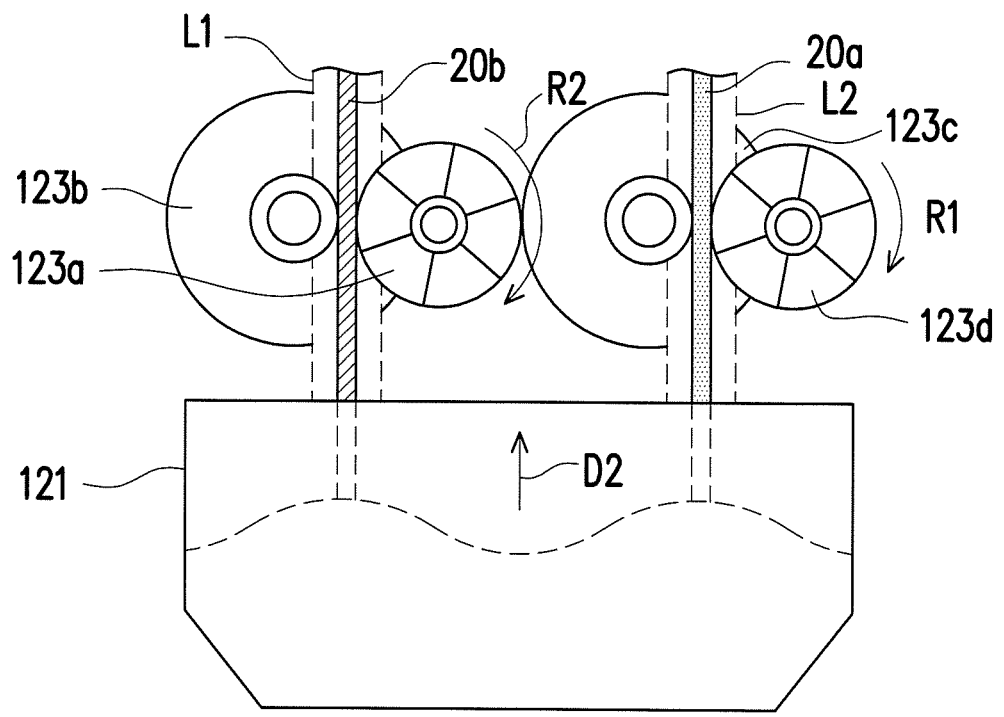

FIG. 3A and FIG. 3B are schematic diagrams of a melting nozzle and a feeding module according to an embodiment of the present disclosure. Referring to FIG. 3A first, in the present embodiment, the feeding module 123 includes a material supply pipeline L1 and a material supply pipeline L2 that are connected to the melting nozzle 121, a first feeding roller 123a, a second feeding roller 123d, a passive roller 123b, and a passive roller 123c. In detail, the first feeding roller 123a and the passive roller 123b are respectively provided on opposite two sides of the material supply pipeline L1. In a filament-extruding period, the first feeding roller 123a and the passive roller 123b together clamp the second forming material 20b in the material supply pipeline L1 and drive the second forming material 20b to advance along a conveying direction D1, and the second feeding roller 123d and the passive roller 123c together clamp the first forming material 20a in the material supply pipeline L2 and drive the first forming material 20a to advance along the conveying direction D1. In other words, a motor (not shown) of the feeding module 123 feeds the first forming material 20a and the second forming material 20b into the melting nozzle 121 by driving the first feeding roller 123a and the second feeding roller 123d towards a first direction R1, and the melting nozzle 121 extrudes the third forming material 20c in the filament-extruding period.

In an exemplary embodiment, in a filament-extruding period, the controller 130 may control a rotation speed of the first feeding roller 123a according to the first feeding-in ratio, and control a rotation speed of the second feeding roller 123d according to the second feeding-in ratio.

Referring to FIG. 3B next, in the present embodiment, in a filament-extruding suspending period, the first feeding roller 123a and the passive roller 123b together clamp the second forming material 20b in the material supply pipeline L1 and drive the second forming material 20b to advance along a conveying direction D2, and the second feeding roller 123d and the passive roller 123c together clamp the first forming material 20a in the material supply pipeline L2 and drive the first forming material 20a to advance along the conveying direction D2. In other words, the motor (not shown) of the feeding module 123 pulls back the first forming material 20a and the second forming material 20b along a direction which is departing from the melting nozzle 121 by driving the first feeding roller 123a and the second feeding roller 123d towards a second direction R2.

Based on the description of FIG. 2, FIG. 3A, and FIG. 3B, in an exemplary embodiment, in the filament-extruding suspending period of the printing module 120, the controller 130 may determine the first pulling-back amount according to the first feeding-in ratio of the first forming material 20a, and determine the second pulling-back amount according to the second feeding-in ratio of the second forming material 20b. The foregoing first pulling-back amount and the second pulling-back amount may be indicated and measured in length units. For example, description of FIG. 3B is continued; when the first pulling-back amount is 6 mm, the controller 130 controls the feeding module 123 to pull back the first forming material 20a by 6 mm along the conveying direction D2. That is, the first pulling-back amount and the second pulling-back amount are individually determined according to corresponding feeding-in ratios.

On such basis, in a filament-extruding suspending period, the controller 130 may control the feeding module 123 to pull back the first forming material 20a according to the first pulling-back amount along the direction which is departing from the melting nozzle 121. Meanwhile, in the filament-extruding suspending period, the controller 130 may control the feeding module 123 to pull back the second forming material 20b according to the second pulling-back amount along the direction which is departing from the melting nozzle 121. In an exemplary embodiment, the first pulling-back amount increases along with an increase of the first feeding-in ratio, and the first pulling-back amount decreases along with a decrease of the first feeding-in ratio. Similarly, the second pulling-back amount increases along with an increase of the second feeding-in ratio, and the second pulling-back amount decreases along with a decrease of the second feeding-in ratio. In this way, in the filament-extruding suspending period, the three dimensional printing apparatus 100 may pull the first forming material 20a and the second forming material 20b away from the melting nozzle 121, so as to prevent forming materials in molten state from dripping on the platform 110 from the melting nozzle 121 in an extrusion stopping period.

Figure 4:
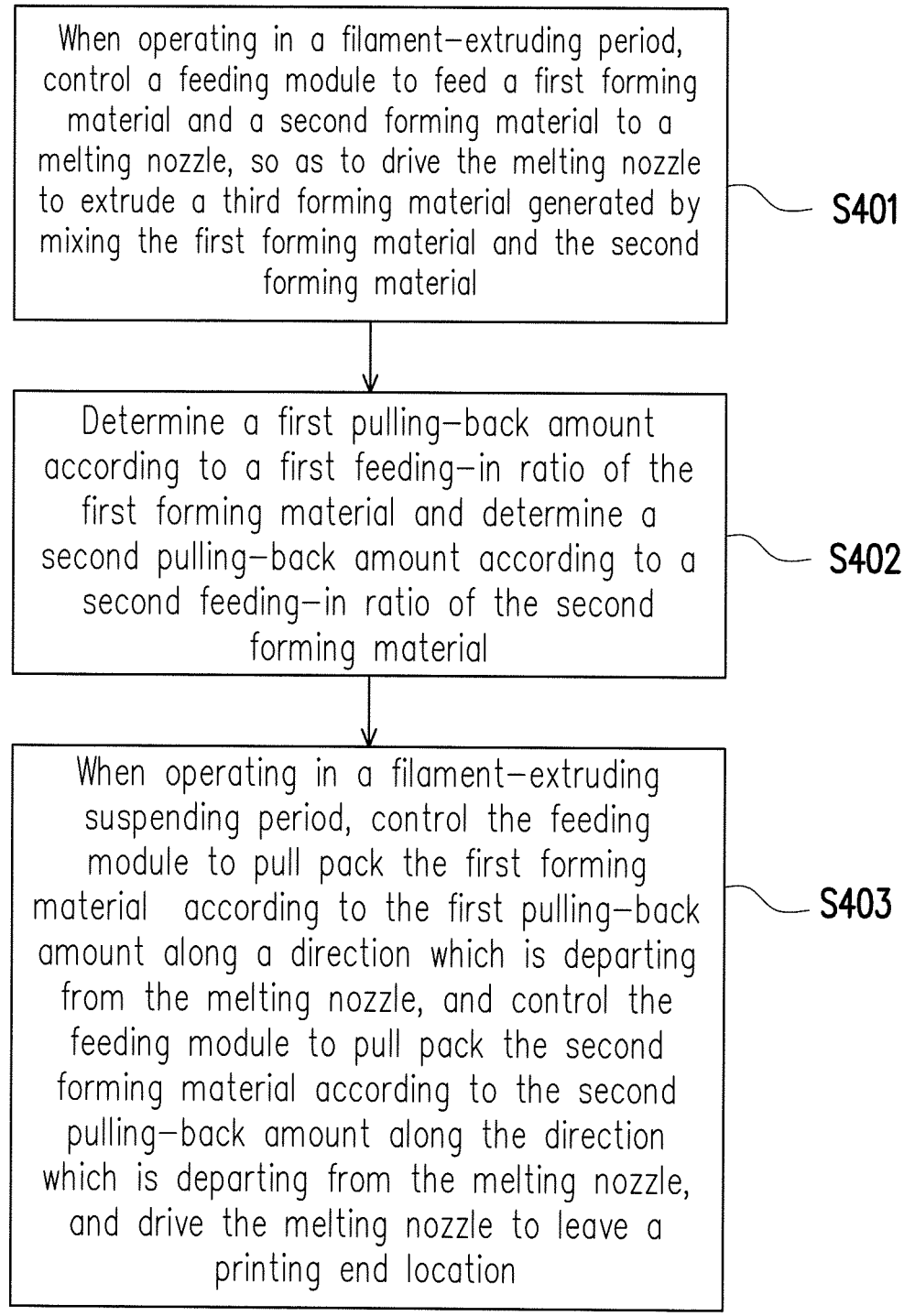
FIG. 4 is a schematic diagram of a method for controlling a three dimensional printing apparatus according to an embodiment of the present disclosure.

In order to further describe how the controller 130 controls the feeding module 123, the present disclosure is described below with reference to an embodiment. FIG. 4 is a schematic diagram of a method for controlling a three dimensional printing apparatus according to an embodiment of the present disclosure. The method of the present embodiment is adapted to the three dimensional printing apparatus 100 of FIG. 2, and detailed steps of a nozzle temperature adjusting method of the present embodiment are described below with reference to each means in the three dimensional printing apparatus 100.

In step S401, when a three dimensional printing apparatus 100 operates in a filament-extruding period, a controller 130 controls a feeding module 123 to feed a first forming material 20a and a second forming material 20b to a melting nozzle 121, so as to drive the melting nozzle 121 to extrude a third forming material 20c generated by mixing the first forming material 20a and the second forming material 20b. In step S402, the controller 130 determines a first pulling-back amount and a second pulling-back amount according to a first feeding-in ratio of the first forming material 20a and a second feeding-in ratio of the second forming material 20b. It should be noted that, because a sum of the first feeding-in ratio and the second feeding-in ratio satisfies a preset percent, the first feeding-in ratio has a correspondence to the second feeding-in ratio. In other words, a preset ratio of the first feeding-in ratio to the second feeding-in ratio also exists. In an embodiment, the controller 130 may obtain the first feeding-in ratio and the second feeding-in ratio according to the preset percent. Therefore, in an embodiment, the controller 130 may also determine the first pulling-back amount and the second pulling-back amount according to the preset percent and the preset ratio of the first feeding-in ratio to the second feeding-in ratio. In step S403, when the three dimensional printing apparatus 100 operates in a filament-extruding suspending period, the controller 130 controls the feeding module 123 to pull pack the first forming material 20a according to the first pulling-back amount along a direction which is departing from the melting nozzle 121, and controls the feeding module 123 to pull pack the second forming material 20b according to the second pulling-back amount along the direction which is departing from the melting nozzle 121, and drives the melting nozzle 121 to leave a printing end location.

It should be noted that, in the filament-extruding period, the melting nozzle 121 extrudes the third forming material 20c in molten state on a platform to establish a three dimensional object 80, and in the filament-extruding suspending period, the melting nozzle 121 stops extruding the third forming material 20c in molten state. A period in which the printing module 120 moves from a printing end location to a printing start location is the filament-extruding suspending period. More specifically, referring to FIG. 2, after the printing module 120 completes a printing action of a first-layer layer object 80b, the printing module 120 first ascends along a Z axis, and then moves along an XY plane to a printing start location of a second-layer layer cut object 80a, and then extrudes the third forming material 20c to print the second-layer layer object 80a. After the printing module 120 completes a printing action of the second-layer layer cut object 80a, the printing module 120 first moves along the XY plane to a printing start location of the second-layer layer cut object 80c, and then extrudes the third forming material 20c to print the second-layer layer cut object 80c. The foregoing filament-extruding suspending period may be a period in which the printing module 120 moves from the printing end location of the first-layer layer cut object 80b to the printing start location of the second-layer layer cut object 80a. Or, the foregoing filament-extruding suspending period may be a period in which the printing module 120 moves from the printing end location of the second-layer layer object 80a to the printing start location of the second-layer layer object 80c.

In an exemplary embodiment, when the first feeding-in ratio of the first forming material 20a is the same as the second feeding-in ratio of the second forming material 20b, the controller 130 sets the first pulling-back amount of the first forming material 20a to be the same as the second pulling-back amount of the second forming material 20b. When the first feeding-in ratio of the first forming material 20a is different from the second feeding-in ratio of the second forming material 20b, the controller 130 determines that the first pulling-back amount of the first forming material 20a is different from the second pulling-back amount of the second forming material 20b. In this way, in the filament-extruding suspending period, the three dimensional printing apparatus 100 of the present disclosure can prevent the third forming material 20c from overflowing from the melting nozzle 121 and dripping on a platform 110, and maintain consistency of a third color of the third forming material 20c.

Figure 5A:
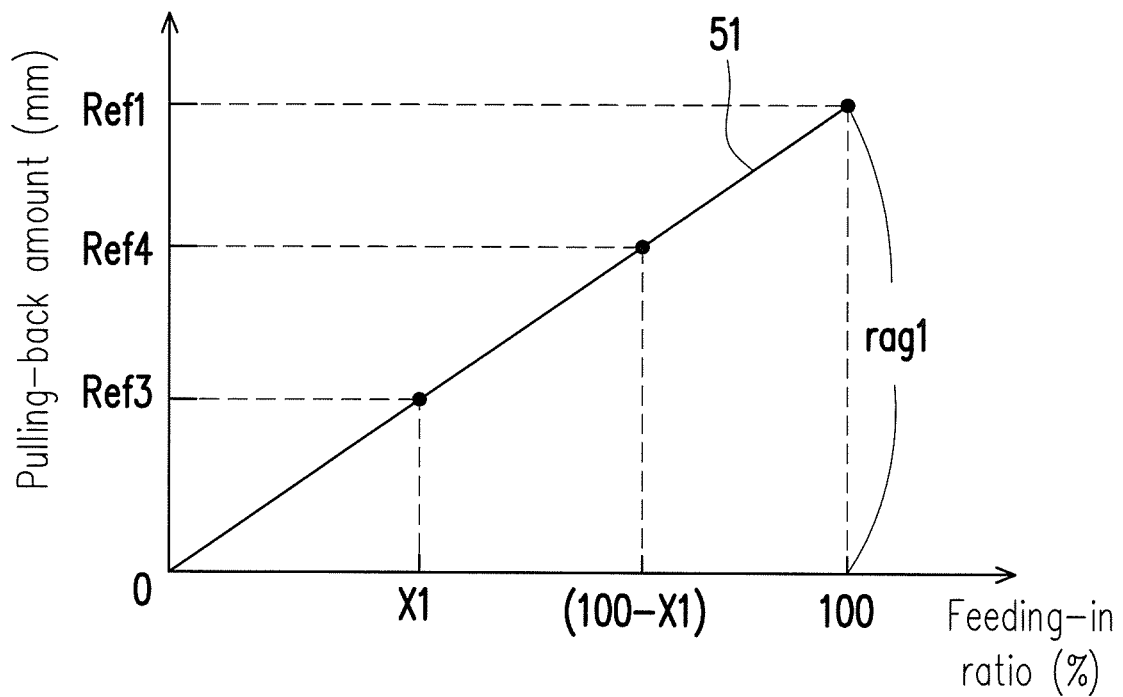
FIG. 5A is a schematic exemplary diagram of pulling-back amount determining according to an embodiment of the present disclosure.

The following further describes how the controller respectively determines the first pulling-back amount and the second pulling-back amount. In an exemplary embodiment, the controller 130 may calculate the first pulling-back amount according to the first feeding-in ratio by using an interpolation method and a first reference range. Similarly, the controller 130 may calculate the second pulling-back amount according to the second feeding-in ratio by using the interpolation method and the first reference range, where the first reference range is between 0 and a first reference value. For example, FIG. 5A is a schematic exemplary diagram of pulling-back amount determining according to an embodiment of the present disclosure. Referring to FIG. 5A, the first pulling-back amount and the second pulling-back amount are values within a first reference range rag1, and the first reference range rag1 is between 0 and a first reference value Ref1. The first reference value Ref1 may be set according to actual application situations, and is not limited in the present disclosure. Generally, the first reference value Ref1 is an ideal pulling-back amount obtained after experiments when a feeding-in ratio of a forming material (that is, the first forming material or the second forming material) is a hundred percent.

Continuing to refer to FIG. 5A, because the controller 130 calculates the first pulling-back amount and the second pulling-back amount within the first reference range rag1 according to the interpolation method, the pulling-back amount and the feeding-in ratio of the forming material (that is, the first forming material or the second forming material) may be indicated as a linear relationship 51 in FIG. 5A. Further, if the first feeding-in ratio is zero percent (0%), the controller 130 determines that the first pulling-back amount is 0 within the first reference range rag1. If the first feeding-in ratio is a hundred percent (100%), the controller 130 determines that the first pulling-back amount is the first reference value Ref1 within the first reference range. Similarly, if the second feeding-in ratio is 0%, the controller 130 determines that the second pulling-back amount is 0 within the first reference range rag1. If the second feeding-in ratio is a hundred percent (100%), the controller 130 determines that the second pulling-back amount is the first reference value Ref1 within the first reference range. In addition, continue to refer to FIG. 5A, if the first feeding-in ratio is X1% and the second feeding-in ratio is (100-X1)%, the controller 130 may determine that the first pulling-back amount is equal to Ref3 and the second pulling-back amount is equal to Ref4 according to the interpolation method corresponding to the linear relationship 51, the first feeding-in ratio, and the second feeding-in ratio.

In addition, in an exemplary embodiment, when the first feeding-in ratio is the same as the second feeding-in ratio, the controller 130 may directly set the first pulling-back amount and the second pulling-back amount to be a second reference value. When the first feeding-in ratio is different from the second feeding-in ratio, the controller 130 calculates the first pulling-back amount according to the first feeding-in ratio by using the interpolation method and one of a second reference range and a third reference range, and calculates the second pulling-back amount according to the second feeding-in ratio by using the interpolation method and the other one of the second reference range and the third reference range. It should be noted that, the controller 130 may obtain the second reference range and the third reference range according to the first reference value and the second reference value. The first reference value and the second reference value may be set according to actual application situations, and are not limited in the present disclosure. Generally, the first reference value is an ideal pulling-back amount obtained after experiments when a feeding-in ratio of a forming material (that is, the first twilling material or the second twining material) is a hundred percent, and the second reference value is an ideal pulling-back amount obtained after experiments when the feeding-in ratio of the forming material (that is, the first forming material or the second forming material) is fifty percent.

Figure 5B:
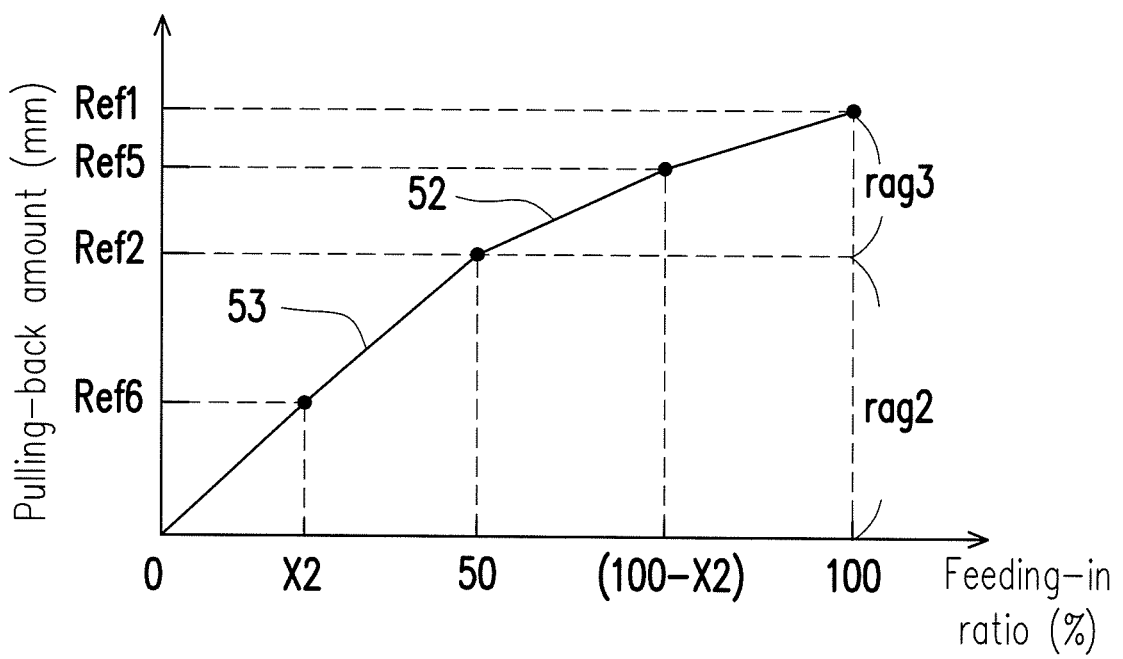
FIG. 5B is a schematic exemplary diagram of pulling-back amount determining according to an embodiment of the present disclosure.

For example, FIG. 5B is a schematic exemplary diagram of pulling-back amount determining according to an embodiment of the present disclosure. Referring to FIG. 5B, the controller 130 obtains a second reference range rag2 and a third reference range rag3 according to the first reference value Ref1 and a second reference value Ref2. The second reference range rag2 is between 0 and the second reference value Ref2; the third reference range rag3 is between the second reference value Ref2 and the first reference value Ref1, where the first reference value Ref1 is greater than the second reference value Ref2.

Continuing to refer to FIG. 5B, because the controller 130 calculates the first pulling-back amount and the second pulling-back amount within the second reference range rag2 according to the interpolation method, the pulling-back amount and the feeding-in ratio of the forming material (that is, the first forming material or the second forming material) may be indicated as a linear relationship 52 and a linear relationship 53 in FIG. 5B. If the first feeding-in ratio is 0%, the controller 130 determines that the first pulling-back amount is 0 within the second reference range rag2. If the first feeding-in ratio is 50%, the controller 130 determines that the first pulling-back amount is the second reference value Ref2 used for distinguishing the second reference range rag2 from the third reference range rag3. If the first feeding-in ratio is 100%, the controller 130 determines that the first pulling-back amount is the first reference value Ref1 within the third reference range rag3.

In addition, continue to refer to FIG. 5B, if the first feeding-in ratio is X2% and the second feeding-in ratio is (100-X2)%, the controller 130 may calculate that the first pulling-back amount is equal to Ref6 according to the first feeding-in ratio by using the interpolation method and the second reference range rag2. In addition, the controller 130 may calculate that the second pulling-back amount is equal to Ref5 according to the second feeding-in ratio by using the interpolation method and the third reference range rag3. If optimum setting received by the controller 130 is assuming that the first reference value Ref1 is equal to 12 mm and the second reference value Ref2 is equal to 8 mm, the controller 130 may determine the first pulling-back amount and the second pulling-back amount according to the following Table (1) by means of the interpolation method. However, Table (1) is merely an embodiment, and is not intended to limit the present disclosure.

TABLE 1

| First feeding-in ratio | Second feeding-in ratio | First pulling-back amount (mm) of the first forming material | Second pulling-back amount (mm) of the second forming material |
|---|---|---|---|
| 0% | 100% | 0 | 12 |
| a% (a < 50) | (100 − a)% | $\frac{8}{50} \cdot a$ | $12 - \frac{a \cdot (12 - 8)}{(100 - 50)}$ |
| 50% | 50% | 8 | 8 |
| a% (a > 50) | (100 − a)% | $12 - \frac{(100 - a) \cdot (12 - 8)}{(100 - 50)}$ | $\frac{8}{50} \cdot (100 - a)$ |
| 100% | 0% | 12 | 0 |

Based on the above, in the embodiments of the present disclosure, a first pulling-back amount of a first forming material is determined according to a first feeding-in ratio of the first forming material, and a second pulling-back amount of a second forming material is determined according to a second feeding-in ratio of the second forming material. In a period in which the printing module moves to a next printing start point, the feeding module pulls back the first fainting material according to the first pulling-back amount along a direction which is departing from the melting nozzle and pulls back the second forming material according to the second pulling-back amount along the direction which is departing from the melting nozzle. In this way, the three dimensional printing apparatus of the present disclosure can prevent forming materials in molten state from overflowing from the melting nozzle and dripping on the platform, and maintain consistency of a harmonious color generated by mixing multiple forming materials, so as to prevent the three dimensional printing apparatus from printing a three dimensional printed object with a non-uniform color.

Although the present disclosure is disclosed above by using the embodiments, the embodiments are not intended to limit the present disclosure. Any person of ordinary skill in the art can make some variations and modifications to the present disclosure without departing from the spirit and scope of the present disclosure. Therefore, the protection scope of the present disclosure is subject to the appended claims.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A three dimensional printing apparatus, comprising:
a printing module, comprising:
a melting nozzle, configured to melt a first forming material having a first color and a second forming material having a second color; and
a feeding module, configured to feed the first forming material and the second forming material to the melting nozzle in a filament-extruding period; and
a controller, coupled to the printing module, and configured to: determine a first pulling-back amount and a second pulling-back amount according to a first feeding-in ratio of the first forming material and a second feeding-in ratio of the second forming material in a filament-extruding suspending period of the printing module; control the feeding module to pull pack the first forming material according to the first pulling-back amount along a direction which is departing from the melting nozzle in the filament-extruding suspending period, and control the feeding module to pull pack the second forming material according to the second pulling-back amount along the direction which is departing from the melting nozzle in the same filament-extruding suspending period, wherein a ratio of the first feeding-in ratio and the second feeding-in ratio satisfies a preset ratio,
wherein the first feeding-in ratio is a ratio of the feeding-in amount of the first forming material to an overall feeding-in amount of the melting nozzle and the second feeding-in amount is a ratio of the feeding-in amount of the second forming material to the overall feeding-in amount of the melting nozzle,
wherein the printing module moves from a printing end location to a printing start location in the filament-extruding suspending period, and the melting nozzle stops extruding the third forming material in the filament-extruding suspending period,
wherein the controller obtains a second reference range and a third reference range according to a first reference value and a second reference value; the second reference range is between 0 and the second reference value; the third reference range is between the second reference value and the first reference value, and the first reference value is greater than the second reference value;
wherein if the first feeding-in ratio is the same as the second feeding-in ratio, the controller directly sets the first pulling-back amount and the second pulling-back amount as the second reference value; and
wherein if the first feeding-in ratio is different from the second feeding-in ratio, the controller calculates the first pulling-back amount according to the first feeding-in ratio by using an interpolation method and one of the second reference range and the third reference range, and calculates the second pulling-back amount according to the second feeding-in ratio by using the interpolation method and the other one of the second reference range and the third reference range.

2. The three dimensional printing apparatus according to claim 1, wherein the melting nozzle extrudes a third forming material generated by mixing the first first forming material and the second forming material, so that the third forming material is cured into a three dimensional object on the platform; the third forming material has a third color, and the third color is determined according to the first feeding-in ratio and the second feeding-in ratio.

3. The three dimensional printing apparatus according to claim 1, wherein the feeding module comprises a first feeding roller and a second feeding roller; the feeding module feeds the first forming material and the second forming material into the melting nozzle by driving the first feeding roller and the second feeding roller to rotate towards a first direction; and the feeding module pulls back the first forming material and the second forming material along the direction which is departing from the melting nozzle by driving the first feeding roller and the second feeding roller towards a second direction.

4. The three dimensional printing apparatus according to claim 3, wherein the controller controls a rotation speed of the first feeding roller according to the first feeding-in ratio, and controls a rotation speed of the second feeding roller according to the second feeding-in ratio.

5. The three dimensional printing apparatus according to claim 1, wherein if the first feeding-in ratio is zero percent, the first pulling-back amount is 0 within the second reference range; if the first feeding-in ratio is fifty percent, the first pulling-back amount is the second reference value used for distinguishing the second reference range from the third reference range; and if the first feeding-in ratio is a hundred percent, the first pulling-back amount is the first reference value within the third reference range.

* * * * *